March 24, 1959    J. J. PARKER ET AL    2,879,068
CAM-OPERATED WORK-HOLDER FOR SPLINED ARTICLES
Filed May 16, 1957

INVENTORS
JOHN J. PARKER & LONDON T. MORAWSKI
BY
ATTORNEYS

United States Patent Office 2,879,068
Patented Mar. 24, 1959

2,879,068

CAM-OPERATED WORK-HOLDER FOR SPLINED ARTICLES

John J. Parker and London T. Morawski, Detroit, Mich.

Application May 16, 1957, Serial No. 659,550

5 Claims. (Cl. 279—1)

This invention relates to work-holding devices particularly for work-pieces having splines or gear teeth, by engagement with which a work-piece is held for performing machining or gaging operations thereon.

The invention relates more particularly to a chuck for holding splined articles by opposing torques exerted upon the side faces of the teeth of the work-piece whereby accurate centering of the piece upon the teeth of the chuck is assured.

In devices of this class, it is common to provide an arbor composed of two or more axially spaced toothed members, one of which may be rotated slightly relative to another for displacing or disaligning the teeth of the two members. In devices of this class as heretofore constructed, it has been necessary to utilize somewhat complicated mechanism for introducing the rotary motion through the use of helically splined members and the like.

It is an object of the present invention to provide an improved construction for work-holders of this class in which there is provided one or more relatively shiftable members carrying teeth for engaging the work-piece, together with a simple, rugged direct acting cam means for imparting a rocking movement to one of the members in response to axial translation.

Another object is to provide in a device of the class described a helical cam means positioned as close as possible to the work-engaging teeth of the relatively rockable members.

Further objects and advantages of the present invention will be apparent from the following description, reference being had to the accompanying drawing wherein a preferred form of the present invention is illustrated.

Figure 1:
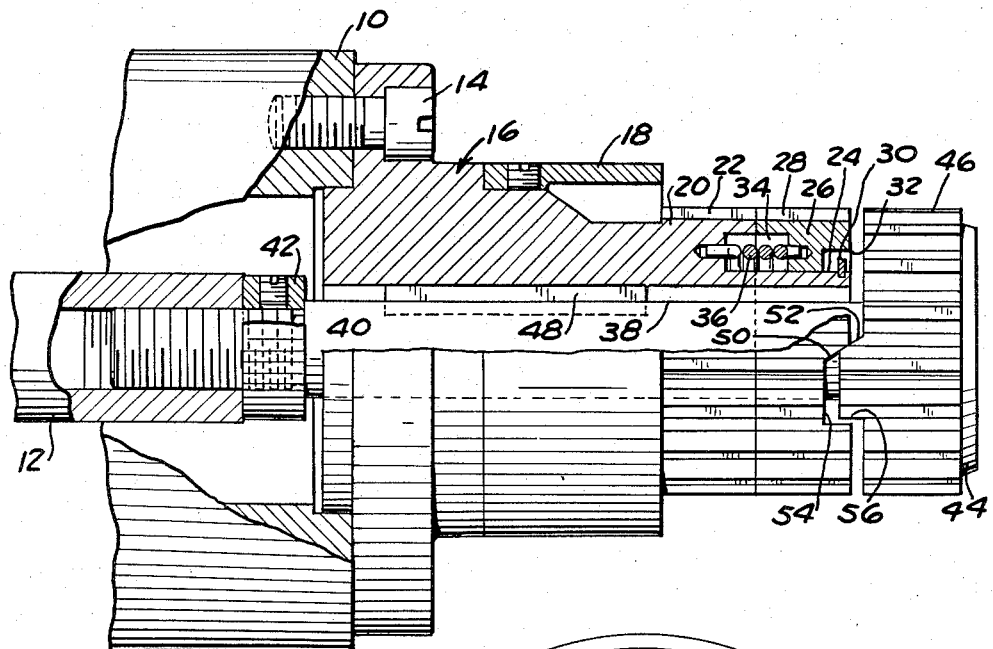
Fig. 1 is a side view partly in section of a work-holding chuck embodying a preferred form of the present invention.
Figure 2:
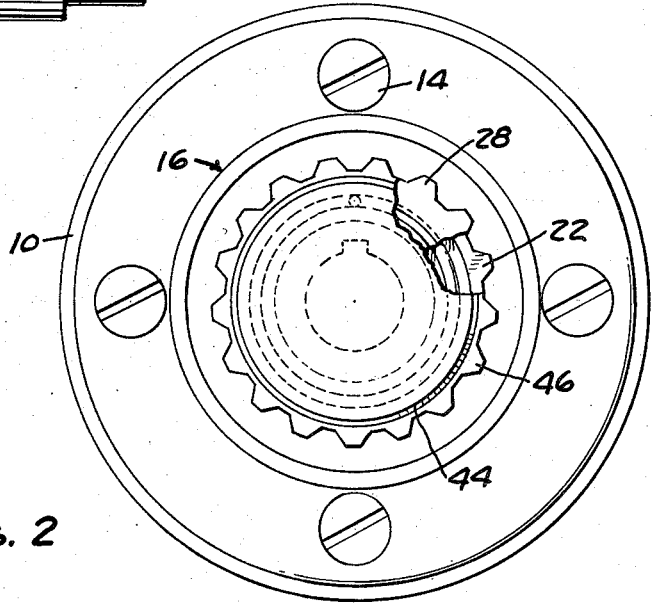
Fig. 2 is an end view partly broken away of the device shown in Fig. 1.

There is illustrated in Fig. 1 a machine tool spindle 10 within which is an actuator bar 12 which is shiftable to the right and left by a mechanism not shown, for the purpose of engaging or disengaging chucks, collets and the like attached to the spindle. Secured to the spindle 10 by bolts 14 is a main body member 16 carrying a stop collar 18 removably positioned thereon. The body 16 has an extension 20 provided with teeth 22 for engaging the splined teeth of a work-piece.

The right hand end of the body 16 is reduced in diameter as indicated at 24 to provide a journal upon which is rotatably mounted a member 26 carrying work-engaging teeth 28. A snap ring 30 in a recess 32 retains the member 26 upon the extension 24. A chamber 34, provided by counterbores in the adjacent faces of members 20 and 26, contains a torsion spring 36 which serves to bias the member 26 in one direction of angular motion.

The body 16 has a bore 38 within which is slideably mounted a shaft 40. At its left hand end the shaft is threaded into the end of the actuator bar 12 and locked by a collar 42. The right hand end of shaft 40 has formed integrally thereon a work-engaging member 44 having teeth 46 which match and align with the teeth 22. A sliding key 48 is provided between shaft 40 and bore 38.

Formed on the right hand face of member 26 and the left hand face of member 44 are a pair of co-operating cam faces 50 and 52. These are inclined to the axis of shaft 40 to produce a helical action, and extend radially outwardly to the periphery of the members 26 and 44. The cam surface 50 forms one wall of a notch 54 while the surface 52 forms one side of a projection 56.

In operation, with the parts in the position shown in Fig. 1, a work-piece may be slipped over the teeth 46, 28 and 22. The spring 36 urges the member 26 in a counterclockwise direction when viewed from the right hand end, and thus holds the cam surface 50 in contact with the cam surface 52 at all times. In the released position which is shown on the drawing, the teeth 28 line up with the teeth 22.

After the work-piece has been mounted, the actuator bar 12 is pulled to the left, carrying with it the shaft 40 and the member 44. The cam 52 drives the cam 50 upwardly in Fig. 1, thus rocking member 26 clockwise when viewed from the right hand end. This causes teeth 28 to exert a torque upon one side of the teeth of the work-piece, while the teeth 22 and 46 exert a a counter-torque upon the opposite side faces of the teeth. This clamps the splined work-piece securely and centrally of the axis of the work-holder.

It will thus be seen that the present invention provides a simple and rugged mechanism for holding splined work-pieces upon the side faces of their teeth. It, furthermore, provides a simple and durable actuating mechanism to cause rocking motion of the clamping device. The cam surfaces are located closely adjacent the clamping teeth themselves and are simple and rugged integral parts of the work-engaging members.

While the form of embodiment of the invention as herein disclosed constitutes a preferred form, it is to be understood that other forms might be adopted, all coming within the scope of the claims which follow.

What is claimed is as follows:

1. A construction for holding a splined work-piece comprising two work-engaging members each having work-engaging teeth of lesser extent than the teeth of the work-piece to be engaged, said members being shiftable toward and away from each other in the direction of their axis and being relatively rotatable, a first cam surface upon one member inclined to the axis and extending radially outward to the outer periphery of the teeth, a second cam surface upon the second member of like inclination and extent, said cam surfaces defining a portion of a helix and means for producing relative axial displacement of the members with the cam surfaces in contact whereby a rocking displacement of the members is produced to clamp a work-piece by opposing torques applied through said members to the side faces of the teeth of the work-piece.

2. A construction for holding a splined work-piece comprising two work-engaging members each having work-engaging teeth of lesser extent than the teeth of the work-piece to be engaged, said members being shiftable toward and away from each other in the direction of their axis and being relatively rotatable, a first cam surface upon one member inclined to the axis and extending radially outward to the outer periphery of the teeth, a second cam surface upon the second member of like inclination and extent said cam surfaces defining a portion of a helix and means for producing relative axial displacement of the members with the cam surfaces in contact whereby a rocking displacement of the members is produced to clamp a work-piece by opposing torques applied through said members to the side faces of the teeth of the work-piece, and a torsion spring for biasing the members against cam induced displacement whereby return of the members to undisplaced position is produced.

3. A work-holder for splined work-pieces comprising a pair of axially spaced work-engaging members having matching teeth on their peripheries, means mounting one member for axial sliding motion toward and away from the other member, a third work-engaging member having teeth matching the other teeth and rockably mounted between the first and second members, a pair of co-operating cam surfaces inclined to the axis of the member and positioned one upon the third member and the other upon one of the pair of members, said cam surfaces defining a portion of a helix and means for drawing the pair of members toward each other, said cam surfaces being formed directly upon the respective members and extending radially outwardly to the outer periphery of the teeth whereby relative angular displacement of the third member may be produced to clamp a work-piece by counter-torques applied to the side faces of the teeth of the work-piece as the pair of members are drawn together.

4. A work-holder for splined work-pieces comprising a pair of axially spaced work-engaging members having matching teeth on their peripheries, means mounting one member for axial sliding motion toward and away from the other member, a third work-engaging member having teeth matching the other teeth and rockably mounted between the first and second members, a pair of co-operating cam surfaces inclined to the axis of the member and positioned one upon the third member and the other upon one of the pair of members, said cam surfaces defining a portion of a helix and means for drawing the pair of members toward each other, said cam surfaces being formed directly upon the respective members and extending radially outwardly to the outer periphery of the teeth whereby relative angular displacement of the third member may be produced to clamp a work-piece by counter-torques applied to the side faces of the teeth of the work-piece as the pair of members are drawn together, and a torsion spring connected between the third member and said other members.

5. A work holder for splined work pieces comprising a pair of axially spaced work-engaging members having matching teeth on their peripheries, means mounting one member for axial sliding movement toward and away from the other member and rotatably fixed with respect to the other member, a third work-engaging member having teeth matching the other teeth and rockably mounted between the first and second members, said third member having opposite end faces juxtaposed to the adjacent end faces of the first pair of members, a pair of cooperating cam surfaces inclined to the axis of the member and positioned one upon one end face of the third member and the other upon the adjacent end face of one of the pair of members, means for drawing the pair of members axially toward each other with the cam surfaces in contact whereby relative angular displacement may be produced to clamp a work piece by counter-torques applied to the side faces of the teeth of the work piece as the pair of members are drawn together, one end face of the third member and the adjacent end face of one of said pair of members having annular sockets therein concentric with the axis of said members and a torsion spring located within said annular sockets with its ends connected one to said third member and one to said one of said pair of members, said torsion spring biasing said third member in a direction to maintain said cam surfaces in contact and the teeth of said three members in alignment.

References Cited in the file of this patent

UNITED STATES PATENTS

| | | |
|---|---|---|
| 2,665,136 | Fallon | Jan. 5, 1954 |
| 2,762,629 | Dalby | Sept. 11, 1956 |